(12) United States Patent
Boussant-Roux et al.

(10) Patent No.: US 7,642,211 B2
(45) Date of Patent: Jan. 5, 2010

(54) REDUCED SWEATING AZS PRODUCT

(75) Inventors: Yves Boussant-Roux, Montfavet (FR); Isabelle Cabodi, Cavalllon (FR); Michel Gaubil, Avignon (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 217 days.

(21) Appl. No.: 11/662,922

(22) PCT Filed: Sep. 14, 2005

(86) PCT No.: PCT/FR2005/002277

§ 371 (c)(1),
(2), (4) Date: Jun. 25, 2007

(87) PCT Pub. No.: WO2006/032757

PCT Pub. Date: Mar. 30, 2006

(65) Prior Publication Data

US 2007/0270303 A1    Nov. 22, 2007

(30) Foreign Application Priority Data

Sep. 20, 2004  (FR) .................................. 04 09914

(51) Int. Cl.
*C04B 35/484* (2006.01)

(52) U.S. Cl. ..................................... 501/105; 501/107

(58) Field of Classification Search ................. 501/105, 501/107

See application file for complete search history.

(56) References Cited

U.S. PATENT DOCUMENTS

| 2,271,366 | A |   | 1/1942 | Field |
| 2,438,552 | A |   | 3/1948 | Field |
| 4,139,394 | A | * | 2/1979 | Esnoult et al. .............. 501/105 |
| 4,910,174 | A | * | 3/1990 | Bert et al. .................... 501/105 |
| 6,509,287 | B2 | * | 1/2003 | Boussant-Roux et al. ... 501/105 |
| 2002/0013212 | A1 | * | 1/2002 | Boussant-Roux et al. ... 501/105 |

FOREIGN PATENT DOCUMENTS

| EP | 0939065 |   | 2/1999 |
| FR | 1208577 | * | 7/1958 |

* cited by examiner

*Primary Examiner*—Karl E Group
(74) *Attorney, Agent, or Firm*—Young & Thompson

(57) ABSTRACT

An AZS type fused cast refractory product presenting the following chemical composition, as a percentage by weight: $ZrO_2$: 15.5% to 22%; $SiO_2$: 10.5% to 15%; $Na_2O+K_2O+Li_2O$: 1.0% to 2.5%; impurities: <1%. Application to glass furnaces, in particular to the superstructures and crowns thereof.

11 Claims, No Drawings

REDUCED SWEATING AZS PRODUCT

The present invention relates to an AZS (alumina-zirconia-silica) type fused cast refractory product with a low degree of exudation of its vitreous phase at the operating temperatures of the glass furnaces in which it is used. The invention also relates to the use of that product in the superstructures of a glass furnace.

AZS type fused cast refractory products may be obtained by melting a mixture of suitable starting materials in an electric arc furnace, or by using any other fusion technique which is suitable for said products. The molten liquid is then cast into a mold to obtain formed parts directly. In general, the product then undergoes a controlled cooling cycle to be brought to ambient temperature without fracturing. This operation is known in the art as "annealing".

AZS products have been known for decades for application in glass furnaces in which they come into contact with molten glass. Research has been directed at improving resistance to cracking and to corrosion by the molten glass.

U.S. Pat. No. 2,271,366 describes the first examples of producing such products. Crystallographic analysis of said examples shows crystals of zirconia and corundum, i.e. alpha alumina, in a vitreous matrix (or "phase"). U.S. Pat. No. 2,271,366 does not study the influence of alkaline oxides. Further, the examples in Table 1 of U.S. Pat. No. 2,271,366 indicate that when the zirconia content is below 22.1%, a crystalline mullite phase appears, which results in reducing resistance to corrosion by the molten glass.

U.S. Pat. No. 2,438,552 describes AZS products comprising, by weight, 45% to 70% of $Al_2O_3$, 14% to 40% of $ZrO_2$, 9% to 12% of $SiO_2$, 1% to 2.2% of $Na_2O$, 0.4% to 1.7% of iron oxide and 0.2% to 0.8% of MgO+CaO. However, those products, which include a large number of oxides, are expensive to manufacture. U.S. Pat. No. 2,438,552 does not suggest that any of those oxides are optional.

U.S. Pat. No. 2,271,366, equivalent to French patent FR-A-0 883 990, relates to AZS products comprising more than 75% of $Al_2O_3+ZrO_2$, optionally containing alkaline species such as $Na_2O$. The silica content must therefore be less than 10%.

However, none of documents U.S. Pat. No. 2,271,366, U.S. Pat. No. 2,438,552 and U.S. Pat. No. 2,271,366 tackles the problem of exudation of the vitreous phase, which is the cause of defects in the glass.

European patent EP-B1-0 939 065 proposes reducing the amount of exudation from AZS products containing 20% to 59% of zirconia by adding $B_2O_3$, $P_2O_5$ and at least one oxide from the group $SnO_2$, ZnO, CuO and $MnO_2$. Adding said oxides, which are not present as impurities in conventional starting materials, leads to production overcosts and possibly to problems with staining.

Current commercially available AZS products such as ER-1681, ER-1685 or ER-1711 manufactured by Saint-Gobain SEFPRO contain, by weight, 45% to 50% of $Al_2O_3$, 32% to 40% of $ZrO_2$, 12% to 16% of $SiO_2$ and about 1% of $Na_2O$. Said products are suitable for the manufacture of glass furnaces, especially for zones which come into contact with molten glass, the superstructure, i.e. the walls beneath the crown not in contact with molten glass, and the crown of glass furnaces. However, to reduce the number of defects and thus improve yields, current products used for superstructures and crowns are not entirely satisfactory. At the operating temperatures of the glass furnaces in which they are used, i.e. about 1500° C. at the superstructure, problems with exudation of their vitreous phase may crop up.

Thus, there is a need for novel fused cast AZS refractory products comprising a minimum of different constituents and having a low degree of exudation at about 1500° C.

The invention aims to satisfy this need.

In accordance with the invention, this aim is achieved by a fused cast AZS type refractory product, note worthy in that it has the following chemical composition, as percentages by weight:

| | |
|---|---|
| $ZrO_2$: | 15.5% to 22%; |
| $SiO_2$: | 10.5% to 15%; |
| $Na_2O + K_2O + Li_2O$: | 1.0% to 2.5%; |
| Impurities: | <1%; |
| $Al_2O_3$: | complement to 100%. |

The inventors have thus discovered, surprisingly, that exudation in AZS products could be reduced by adjusting the ratios between the various constituents of conventional AZS products, without adding additional species. Manufacture is thus simplified and cheaper.

The parts produced also have good industrial feasibility, as described in details below with regard to the chemical analysis of the product of the invention.

Unless otherwise mentioned, all of the percentages are percentages by weight.

The term "impurities" means the following constituents, which are present in the starting materials used or result from manufacture of the product: halogens, for example fluorine, chlorine, etc; calcium oxides; magnesium; boron; phosphorus; chromium; titanium; and iron. The total amount of impurities is less than 1%, and preferably, the amount of each species of impurity is less than 0.5%. Preferably again, the total amount of impurities is less than 0.5% and/or the amount of each species of impurity is less than 0.1%.

The amount of zirconia turns out to have a major influence on exudation and must be kept below 22%, preferably below 19%.

In contrast, it must not be too low, otherwise the product loses its resistance in service. In fact, zirconia is a highly refractory constituent which has very good high temperature chemical resistance. In accordance with the invention, the $ZrO_2$ content is more than 15.5%, preferably more than 16%.

The inventors have also discovered that the $Al_2O_3/ZrO_2$ weight ratio influences the efficacy of exudation resistance. Preferably, the $Al_2O_3/ZrO_2$ weight ratio is 2.9 or more, preferably more than 3, more preferably 3.7. According to the invention, the $Al_2O_3/ZrO_2$ weight ratio is preferably 5.5 or less.

The silica content is 10.5% or more, preferably 12%. Advantageously, the product feasibility is thereby improved. Feasibility is representative of the number of parts which, after manufacture, have no cracks rendering them unsuitable for application in a glass furnace.

The silica content is 15% or less. Advantageously, the high temperature mechanical strength, i.e. at more than 1500° C., is thereby improved.

Silica is the principal constituent of the vitreous phase. Preferably, the vitreous phase content is 17% or more, preferably 19%, and/or 24% or less, preferably 22%, as a percentage by weight.

The presence of sodium and/or potassium and/or lithium oxide in AZS products is well known in the art. It is conventionally necessary to provide the vitreous phase with suitable physical and chemical characteristics. According to the invention, the amount of $Na_2O+K_2O+Li_2O$ must be in the range 1% to 2.5%.

Preferably, the $SiO_2/(Na_2O+K_2O+Li_2O)$ weight ratio is over 7 and/or less than 9, more preferably less than 8. Advantageously, the exudation resistance of the products of the invention is thereby improved.

For cost reasons, sodium oxide is preferable.

The products of the invention differ from conventional AZS products in their particular crystalline composition. They are exclusively constituted by crystals of corundum and free zirconia in a vitreous phase and are free of eutectic alumina-zirconia crystals.

The following non-limiting examples are given with the aim of illustrating the invention.

The products manufactured for these examples were produced from "conventional" starting materials. In particular, alumina, zirconia sand, sodium carbonate and CC10 zirconia sold by Saint-Gobain ZIRPRO were used.

For the most part, the impurities were constituted of calcium and magnesium oxides.

The products were obtained by melting the starting materials in a Héroult type electric fusion furnace, the batch of starting materials being heated using a long arc.

Oxidizing conditions and agitation were continued during heating by blowing oxygen.

Table 1 provides the compositions of the test products and the results of the tests carried out on the products.

Example 1 corresponds to a reference product. "VP" means "vitreous phase", and "ND" means "not determined".

The feasibility was adjudged "good" if a block, with dimensions 250×20×250 mm [millimeter], had no "through" cracking and/or a length of more than 20 mm. Said defects can lead to complete disintegration of the block when used in a glass furnace.

Test A allowed the resistance of the products to exudation to be determined. Samples of the test products, in the form of bars with a length of 100 mm and a diameter of 24 mm, underwent two cycles of 4 h [hours] at 1500° C., the temperature ramp-up and ramp-down being at 100° C./h. The variation in volume (as a %) of the sample was measured following these two cycles, corresponding to an exudation value, expressed as a %. A product was considered to be particularly advantageous if that volume variation was less than 1.5%, that obtained with the reference product being 3.5%.

Test B determined the resistance to corrosion in the vapor phase. Glass furnaces have a corrosive atmosphere due to vaporization of certain of the elements constituting the glass being produced. That corrosive atmosphere transforms the products at high temperatures and causes weakening, which may result in destructuring in operation. Test B was carried out at 1500° C. for 100 h in a caustic atmosphere. Table 1 shows the thickness of the transformed zone, in mm. A product was considered to be acceptable only if that thickness was less than that obtained with the reference product, i.e. less than 5.5 mm.

Test C allowed the resistance of the products to collapse under load to be determined. It consisted in measuring the deformation of a sample subjected to a load of 0.2 MPa [megapascal] during a rapid temperature ramp-up, at 250° C./h, up to 1745° C. The temperature at which the sample collapsed by 0.25% was measured. That temperature is given in ° C. in Table 1. A product was considered to be acceptable only if that temperature was at least as high as that obtained with the reference product, i.e. 1740° C.

TABLE 1

| N° | $Al_2O_3$ | ZrO | $SiO_2$ | $Na_2O$ | VP (%) | $Al_2O_3/ZrO_2$ | $SiO_2/Na_2O$ | Feasibility | Test A (%) | Test B (mm) | Test C (° C.) |
|---|---|---|---|---|---|---|---|---|---|---|---|
| 1 | 53.6 | 31 | 14 | 1.4 | 21 | 1.7 | 10 | Good | 3.5 | 5.5 | 1740 |
| 2 | 52.9 | 30.1 | 15 | 2.0 | 24 | 1.8 | 7.5 | Good | 4.8 | ND | ND |
| 3 | 61.4 | 26.6 | 10.3 | 1.7 | 17 | 2.3 | 6.1 | Cracks | ND | ND | ND |
| 4 | 60.6 | 25.8 | 12.0 | 1.6 | 19.2 | 2.3 | 7.5 | Good | 3.3 | ND | ND |
| 5 | 62.0 | 24.3 | 12.0 | 1.7 | 19.5 | 2.6 | 7.1 | Good | 2.8 | ND | ND |
| 6 | 62.3 | 23.1 | 13.3 | 1.3 | 20 | 2.7 | 10.6 | Good | 1.7 | ND | ND |
| 7 | 63.2 | 22.4 | 12.8 | 1.6 | 20 | 2.8 | 8 | Good | 1.6 | ND | ND |
| 8 | 64.4 | 21.6 | 12.9 | 1.1 | 18.5 | 3.0 | 11.7 | Good | 1.2 | ND | ND |
| 9 | 63.6 | 21.6 | 12.8 | 2.0 | 21.5 | 2.9 | 6.5 | Good | 0.9 | 3.5 | ND |
| 10 | 68.1 | 21.0 | 10.0 | 0.9 | 17 | 3.2 | 11.1 | Cracks | ND | ND | ND |
| 11 | 62.8 | 21.0 | 15.0 | 1.2 | 21 | 3.0 | 12.5 | Good | 0.8 | ND | >1745 |
| 12 | 64.8 | 20.7 | 12.6 | 1.8 | 22.0 | 3.1 | 7.0 | Good | 0.9 | ND | ND |
| 13 | 65.6 | 20.5 | 11.3 | 1.6 | 19.5 | 3.2 | 7.1 | Good | 0.6 | ND | ND |
| 14 | 66.8 | 19.9 | 9.7 | 1.7 | 16.7 | 3.4 | 5.8 | Cracks | ND | ND | ND |
| 15 | 65.7 | 19.8 | 13.2 | 1.3 | 19.5 | 3.3 | 10.1 | Good | 0.7 | ND | ND |
| 16 | 65.5 | 19.7 | 13.3 | 1.5 | 20.5 | 3.3 | 8.6 | Good | 1.0 | ND | ND |
| 17 | 65.8 | 19.4 | 13.7 | 1.1 | 19.0 | 3.4 | 12.5 | Good | 1.0 | ND | ND |
| 18 | 66.7 | 18.4 | 13.1 | 1.8 | 21 | 3.6 | 7.3 | Good | 0.1 | 3.5 | ND |
| 19 | 66.4 | 18.4 | 13.5 | 1.7 | 21.5 | 3.6 | 7.9 | Good | 0.4 | ND | ND |
| 20 | 66.4 | 18.1 | 14.2 | 1.3 | 20.5 | 3.7 | 10.6 | Good | 0.8 | ND | ND |
| 21 | 66.2 | 18.0 | 14.1 | 1.7 | 22.0 | 3.7 | 8.2 | Good | 0 | ND | ND |
| 22 | 67.0 | 17.8 | 13.3 | 1.8 | 21.5 | 3.8 | 7.2 | Good | 0 | ND | ND |
| 23 | 66.5 | 17.8 | 13.9 | 1.8 | 22.0 | 3.7 | 7.9 | Good | 0 | 3.0 | ND |
| 24 | 68.3 | 17.8 | 12.0 | 1.9 | 20.0 | 3.8 | 6.3 | Good | 0.1 | ND | ND |
| 25 | 68.8 | 17.3 | 12.7 | 1.2 | 19.0 | 4.0 | 10.7 | Good | 0.6 | ND | ND |
| 26 | 67.0 | 17.2 | 14.0 | 1.8 | 22.0 | 3.9 | 7.6 | Good | 0 | ND | >1740 |
| 27 | 67.3 | 17.2 | 13.7 | 1.8 | 22 | 3.9 | 7.7 | Good | 0 | ND | ND |
| 28 | 72.2 | 17.2 | 9.8 | 0.8 | 14.0 | 4.2 | 12.0 | Cracks | ND | ND | ND |
| 29 | 65.8 | 16.9 | 15.2 | 2.1 | 24.5 | 3.9 | 7.2 | Good | 0 | ND | 1730 |
| 30 | 68.2 | 16.9 | 13.1 | 1.8 | 21.5 | 4.0 | 7.1 | Good | 0 | ND | ND |
| 31 | 69.6 | 16.8 | 12.0 | 1.6 | 19.0 | 4.1 | 7.7 | Good | 0 | ND | ND |
| 32 | 70.3 | 16.5 | 12.1 | 1.1 | 17.5 | 4.3 | 11.2 | Good | 1.3 | ND | ND |
| 33 | 69.1 | 16.1 | 13.0 | 1.8 | 21.5 | 4.3 | 7.1 | Good | 0 | ND | ND |
| 34 | 70.4 | 16 | 12.6 | 1.0 | 17.5 | 4.4 | 12.6 | Good | 0.7 | ND | ND |

TABLE 1-continued

| N° | $Al_2O_3$ | ZrO | $SiO_2$ | $Na_2O$ | VP (%) | $Al_2O_3$/ $ZrO_2$ | $SiO_2$/ $Na_2O$ | Feasibility | Test A (%) | Test B (mm) | Test C (° C.) |
|---|---|---|---|---|---|---|---|---|---|---|---|
| 35 | 67.6 | 16 | 14.0 | 2.4 | 23 | 4.2 | 5.8 | Good | 0 | ND | ND |
| 36 | 70.1 | 15.9 | 12.3 | 1.7 | 20 | 4.4 | 7.4 | Good | 0 | ND | ND |
| 37 | 70.1 | 15.8 | 12.3 | 1.7 | 20.0 | 4.4 | 7.2 | Good | ND | 3.0 | ND |
| 38 | 73.2 | 15.8 | 9.7 | 1.3 | 16.0 | 4.6 | 7.5 | Cracks | ND | ND | ND |
| 40 | 67.3 | 15.5 | 15.0 | 2.1 | 24.5 | 4.3 | 7 | Good | 0 | ND | 1723 |
| 41 | 70.5 | 15.5 | 12.4 | 1.6 | 20 | 4.5 | 7.6 | Good | 0 | ND | 1744 |
| 42 | 68.6 | 15.2 | 13.4 | 1.7 | 21 | 4.5 | 7.9 | Good | 0 | 5.7 | ND |
| 43 | 70.9 | 14.4 | 12.8 | 1.8 | 21 | 4.9 | 7.1 | Good | 0 | 6.1 | ND |

From Table 1, the following observations can be made:

Product feasibility is good when the silica content is more than 10.5%, preferably more than 12% and when the quantity of vitreous phase is more than 19%.

The results of test A are significantly improved over the reference product when the zirconia content is less than 22%. The results of test A become very good, with an exudation of less than 0.5% when the zirconia content is less than 19%, in particular if the ratio of the silica content to the amount of sodium oxide compound is less than 9, preferably less than 8.

The products with the best results have an $Al_2O_3/ZrO_2$ ratio of 2.9 or more. Preferably, the products of the invention have an $Al_2O_3/ZrO_2$ ratio of 4.5 or less.

The vapor phase corrosion resistance, measured in test B, was improved relative to that of the reference product. For this reason, the zirconia content must be kept above 15.5%.

In order to produce a result which is at least equivalent to that of the reference product in test C, the quantity of vitreous phase must be less than 24%, preferably less than 22%.

The results of tests B and C demonstrate the possibility of using the products of the invention in superstructures or crowns of glass furnaces.

Further, the inventors have observed that the products of the invention have dilatometric behavior that is improved compared with the reference AZS product, the shrinkage by volume on transformation of bound zirconia being low. Advantageously, problems with opening of the joins between blocks are thereby improved.

Crystallographic analysis of the products of the invention generally shows 15.5% to 22% of free zirconia crystals, 17% to 23% of vitreous phase, the complement being corundum. The porosity, measured as the ratio of the pore volume to the total apparent volume, is less than 5%.

As can clearly be seen, the product of the invention has a reduced exudation and good industrial feasibility. Advantageously, the product of the invention may be manufactured using just the conventional constituents of AZS products, without adding additional species. Manufacture is thus simplified and costs are reduced.

Clearly, the present invention is not limited to the implementations described and presented as illustrative, non-limiting examples.

In particular, the invention is not limited by the manufacturing process or by the fusion furnace employed. Any conventional process for fusing and casting AZS products may be employed.

One example of a suitable process for melting starting materials is described in French patent FR-A-1 208 577. In that process, the arc length is adjusted so that its reducing action is minimal, the arc or bubbling gas, preferably an oxidizing gas, e.g. air or oxygen, providing agitation of the molten mass. By way of example, the arc length may be determined to coincide with the hissing arc phenomenon.

The invention claimed is
1. An AZS type fused cast refractory product, comprising the following chemical composition, as a percentage by weight:

| | |
|---|---|
| $ZrO_2$: | 15.5% to 22%; |
| $SiO_2$: | 10.5% to 15%; |
| $Na_2O + K_2O + Li_2O$: | 1.0% to 2.5%; |
| impurities: | <1%; |
| $Al_2O_3$: | complement to 100%. | wherein the $Al_2O_3/ZrO_2$ ratio by weight is 2.9 or more.

2. The product according to claim 1, wherein the $SiO_2/(Na_2O+K_2O+Li_2O)$ weight ratio is less than 9.

3. The product according to claim 2, wherein the $SiO_2/(Na_2O+K_2O+Li_2O)$ weight ratio is less than 8.

4. The product according to claim 1, wherein the $SiO_2/(Na_2O+K_2O+Li_2O)$ weight ratio is more than 7.

5. The product according to claim 1, wherein the $ZrO_2$ content, as a percentage by weight, is 19% or less.

6. The product according to claim 1, wherein the total amount of impurities is less than 0.5% and/or the amount of any species of impurity is less than 0.1%, as a percentage by weight.

7. The product according to claim 1, further comprising a vitreous phase, the vitreous phase content is 17% or more and/or 24% or less.

8. The product according to claim 7, wherein the vitreous phase content is 19% or more and/or 22% or less.

9. An AZS type fused cast refractory product, comprising the following chemical composition, as a percentage by weight:

| | |
|---|---|
| $ZrO_2$: | 15.5% to 22%; |
| $SiO_2$: | 10.5% to 15%; |
| $Na_2O + K_2O + Li_2O$: | 1.2% to 2.5%; |
| impurities: | <1%; |
| $Al_2O_3$: | complement to 100%, | wherein the $Al_1O_3/ZrO_2$ ratio by weight is 2.9 or more and, wherein the $SiO_2/(Na_2O+K_2O+Li_2O)$ weight ratio is less than 9.

10. The AZS type fused cast refractory product, according to claim 9, wherein the $SiO_2/(Na_2O+K_2O+Li_2O)$ weight ratio is more than 7.

11. A superstructure or a crown of a glass furnace comprising an AZS type cast refractory product according to claim 1.

* * * * *

UNITED STATES PATENT AND TRADEMARK OFFICE
CERTIFICATE OF CORRECTION

| | |
|---|---|
| PATENT NO. | : 7,642,211 B2 |
| APPLICATION NO. | : 11/662922 |
| DATED | : January 5, 2010 |
| INVENTOR(S) | : Yves Boussant-Roux et al. |

It is certified that error appears in the above-identified patent and that said Letters Patent is hereby corrected as shown below:

On the title page, please amend item (73) to read as follows:

--(73) Assignee: Saint-Gobain Centre de Recherches et d'Etudes Europeen, Courbevoie (FR)--.

Signed and Sealed this

Thirteenth Day of April, 2010

David J. Kappos
*Director of the United States Patent and Trademark Office*